Sept. 13, 1932.  D. McPHERSON  1,876,718

HOSE NOZZLE HANDLE

Filed April 11, 1929

Duncan McPherson, Inventor

Patented Sept. 13, 1932

1,876,718

UNITED STATES PATENT OFFICE

DUNCAN McPHERSON, OF SAN DIEGO, CALIFORNIA

HOSE NOZZLE HANDLE

Application filed April 11, 1929. Serial No. 354,379.

This invention relates to a device for the direction and control of water being sprinkled or run through the nozzle of a garden hose, or any hose, such device being a handle bar or rod so constructed that, attached to the nozzle of a hose, it takes advantage of the mechanical principle of the lever.

Figure 1:
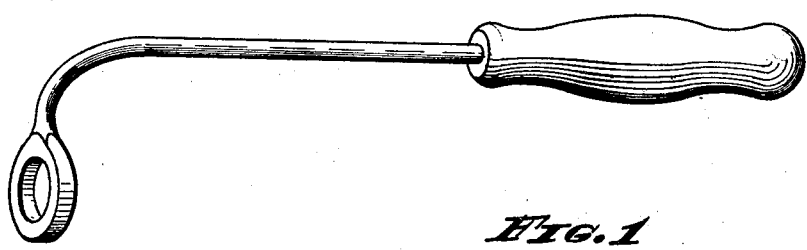
Figure 2:
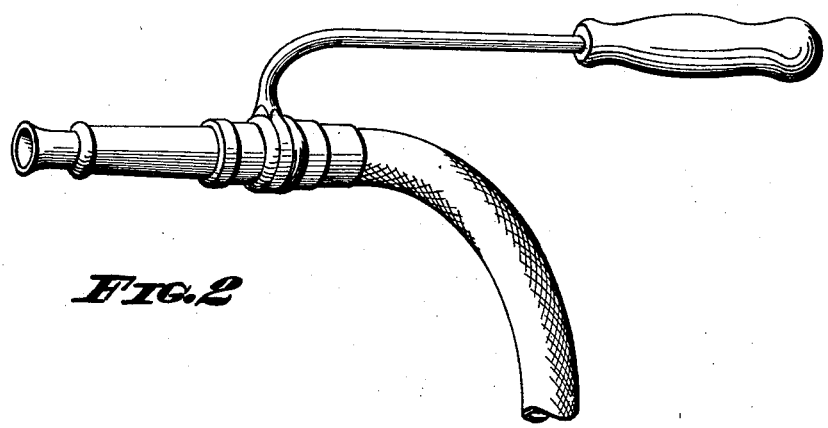

Referring to the drawing, Figure 1 and Figure 2, one form of the invention is shown, first in its simplest form and then attached or connected to a hose and nozzle structure.

As Figure 1 shows, the device consists of a metal rod with a handle on one end and with the other end a flattened out ring, the flattened ring being bent at about a right angle to the handle.

With the ordinary ¾th inch garden hose the length of this rod and handle is about ten inches. The flattened ring end would be about 1½ inches in diameter with the hole about 1 inch in diameter, and flattened to about 1/16th of an inch. This permits the ring end to slip over the common threaded brass nozzle end of the hose and to allow for a certain amount of play after the screwing on of any of the various kinds of nozzle sprinklers.

If the metal ring does not exceed ⅛th of an inch in thickness, and the nozzle has a rubber washer in it of the usual size, the nozzle can be screwed tightly against the brass hose outlet without pressing against the metal ring of the handler, thus allowing the hose and nozzle, though locked tightly together, to turn freely within the ring.

But the greatest problem connected with the hose nozzle is not in its garden use but is the problem arising daily in the cities throughout the world of control of the tremendous pressures incident to the fireman's handling of a fire hose, particularly of the standard 2½ inch hose.

It has evidently never been supposed that there could be a means of balancing the powerful forces at work in a fire hose and then applying the principle of the lever to their control and thus reducing the man power necessary at the nozzle.

But that is exactly what the McPherson nozzle handler accomplishes.

It has been heretofore known that when a standard size fire hose, carrying a stream of water under pressure, has been so positioned and held by the firemen that it has been allowed to form a double bend or S-shape immediately back of the nozzle structure, that the hose then stands of itself, supporting the nozzle structure thereon.

The firemen at the nozzle, when they are able to accomplish this, have simply balanced or equilibrated the forces at work in the hose,—that is, they have equilibrated the pressures of the outgoing water and the resisting pressures of the hose fabric with the nozzle re-action or back pressure. For that force has been completely neutralized. It is in fact being used to advantage in converting a portion of the hose into an S-shaped post, supporting the nozzle, and deflecting the back-pressure to the ground at point of contact.

There has never heretofore, in fire department work, been any discovery of a safe means of accompanying this, nor any means of safely shifting this point of contact.

Until reduced to a state of equilibrium it is in fact very dangerous to put a hose in a bent condition back of the nozzle, and it must be attempted with great caution.

My device is no less than the discovery of a new and very safe means of accomplishing this much-desired result.

It is an equilibrium finder.

The discovery, in its application, would apply to water, steam, or any fluid steam capable of being forced through a hose and nozzle.

I claim:

1. A hose nozzle handler comprising a metal bar with a handle form or hand grip means at one end and the other end designed as a means of securing this bar to the nozzle at or near the hose coupling connection therewith so as to make the bar and nozzle one combined member, allowance being made by such securing means for the free rotation of the nozzle structure therein, this metal bar extending from the nozzle back, and in a plane containing the axis of the nozzle, to a point at the extremity of such bar, said handle form or hand grip means being there located where manual leverage of the nozzle with the stream forcing its way therethrough equilibrates the moments of the several reactions and the weight of the supported parts.

2. In a hose handling device, the combination with a nozzle and hose adaptable to be formed adjacent thereto into a gooseneck or double bend, of a handle arm extending rearwardly from and in offset alignment with said nozzle, said handle arm being rigidly attached to said nozzle but rotatable about the axis thereof, such rearward extension being to a point beyond said double hose bends and having hand grip means on such rearward extremity, such point being where, under manual operation, the moments of the several reactions of the stream and of the weight of the supported parts equilibrate.

3. In a hose handling construction, a hose, a nozzle connected therewith, combined with a manually operated handle secured to said nozzle, a portion of said handle at the rearward extremity thereof being in hand grip form and so positioned as to equilibrate the moments of the several reactions of the stream passing through said nozzle and the weight of said construction.

4. In a hose handling construction, a hose, a nozzle connected therewith, combined with a manually operated handle secured to said nozzle, and said handle being rotatable about the axis of said nozzle, a portion of said handle being so positioned as to equilibrate the moments of the several reactions of the stream passing through said nozzle and of the weight of said construction.

5. In a hose handling device, the combination with a hose and nozzle, of a device arranged to be rigidly secured to said nozzle, a handle arm attached rigidly to said device and shaped to extend rearwardly therefrom and in a direction which is offset from, substantially parallel to, and above the axis of the nozzle, and a handle means fixed to the rearward extremity of said handle arm said rearward extremity being located at a point at which the moments of the several reactions of the stream and of the weight of the supported parts equilibrate.

6. In a hose handling device, the combination with a hose and nozzle, of a device arranged to be rigidly secured to said nozzle but rotatable about the axis of said nozzle, a handle arm attached rigidly to said device and shaped to extend rearwardly therefrom and in a direction which is offset from, substantially parallel to, and above the axis of the nozzle, and a handle means fixed to the rearward extremity of said handle arm, said rearward extremity being located at a point at which the moments of the several reactions of the stream and of the weight of the supported parts equilibrate.

7. In a hose handling device, the combination with a hose and nozzle, of a device arranged to be rigidly secured to said nozzle, a handle arm attached rigidly to said device and shaped to extend rearwardly therefrom and in a direction which is offset from, in the same plane as, and above the axis of the nozzle, and a handle means fixed to the rearward extremity of said handle arm, said rearward extremity being located at a point at which the moments of the several reactions of the stream and of the weight of the supported parts equilibrate.

DUNCAN McPHERSON.